(12) United States Patent
Boutros et al.

(10) Patent No.: US 11,824,778 B2
(45) Date of Patent: *Nov. 21, 2023

(54) DYNAMIC CHAIN OF SERVICE FUNCTIONS FOR PROCESSING NETWORK TRAFFIC

(71) Applicant: Nicira, Inc., Palo Alto, CA (US)

(72) Inventors: Sami Boutros, Union City, CA (US);
Mani Kancherla, Cupertino, CA (US);
Dharmaraja Rajan, Miami, FL (US);
Philip Kippen, Fall City, WA (US);
Yashika Narang, Sunnyvale, CA (US);
Chidambareswaran Raman, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,085

(22) Filed: May 11, 2022

(65) Prior Publication Data
US 2022/0272037 A1    Aug. 25, 2022

Related U.S. Application Data

(63) Continuation of application No. 15/593,516, filed on May 12, 2017, now Pat. No. 11,336,572.

(51) Int. Cl.
*H04L 45/74*    (2022.01)
*H04L 45/586*    (2022.01)
(Continued)

(52) U.S. Cl.
CPC .............. *H04L 45/74* (2013.01); *G06F 9/44* (2013.01); *G06F 9/45558* (2013.01);
(Continued)

(58) Field of Classification Search
CPC ..... H04L 45/74; H04L 12/4633; H04L 41/00; H04L 41/0893; H04L 41/12;
(Continued)

(56) References Cited

U.S. PATENT DOCUMENTS 9,356,866 B1    5/2016  Sivaramakrishnan
9,794,379 B2   10/2017  Kumar
(Continued)

FOREIGN PATENT DOCUMENTS

WO    WO-2016045708 A1 *    3/2016    ............. H04L 41/50
WO    WO-2016119724 A1 *    8/2016    ............. H04L 45/306

OTHER PUBLICATIONS

RFC 7665, "Service Function Chaining (SFC) Architecture", IETF, Oct. 2015 (Year: 2015), 32 pages.
(Continued)

*Primary Examiner* — Habte Mered

(57) ABSTRACT

The technology disclosed herein enables a dynamic chain of service functions for processing network traffic. In a particular embodiment, a method includes, in a logical router for a logical network connecting service functions, receiving a network packet from a service function over the logical network after the network packet has been processed by the service function. The method further includes determining a new classification of the network packet and determining a next service function based on application of a service chain policy to the new classification. The method also includes directing the network packet to the next service function over the logical network.

20 Claims, 8 Drawing Sheets

(51) Int. Cl.
*H04L 45/00* (2022.01)
*H04L 12/46* (2006.01)
*G06F 9/44* (2018.01)
*G06F 9/455* (2018.01)
*H04L 41/00* (2022.01)
*H04L 41/0893* (2022.01)
*H04L 41/12* (2022.01)
*H04L 41/5054* (2022.01)
*H04L 69/22* (2022.01)

(52) U.S. Cl.
CPC .......... *H04L 12/4633* (2013.01); *H04L 41/00* (2013.01); *H04L 41/0893* (2013.01); *H04L 41/12* (2013.01); *H04L 41/5054* (2013.01); *H04L 45/586* (2013.01); *H04L 45/72* (2013.01); *G06F 2009/45595* (2013.01); *H04L 69/22* (2013.01); *H04L 2212/00* (2013.01)

(58) Field of Classification Search
CPC ... H04L 41/5054; H04L 45/586; H04L 45/72; H04L 69/22; H04L 2212/00; H04L 41/0894; H04L 41/0895; H04L 41/122; H04L 41/342; G06F 9/44; G06F 9/45558; G06F 2009/45595
See application file for complete search history.

(56) References Cited

U.S. PATENT DOCUMENTS

| | | |
|---|---|---|
| 10,050,870 B2 | 8/2018 | Reddy |
| 10,083,026 B1 | 9/2018 | Venkata |
| 10,263,832 B1 | 4/2019 | Ghosh |
| RE48,131 E | 7/2020 | Pignataro |
| 2014/0280950 A1 | 9/2014 | Bhanujan |
| 2015/0215172 A1 | 7/2015 | Kumar |
| 2015/0381324 A1 | 12/2015 | Mirsky |
| 2016/0164776 A1 | 6/2016 | Biancaniello |
| 2016/0173373 A1* | 6/2016 | Guichard ............... H04L 69/22 370/392 |
| 2016/0182380 A1 | 6/2016 | Mehra |
| 2016/0218918 A1 | 7/2016 | Chu |
| 2016/0226766 A1 | 8/2016 | Al-Zoubi |
| 2016/0248685 A1* | 8/2016 | Pignataro ............... H04L 67/63 |
| 2017/0012867 A1 | 1/2017 | Royon |
| 2017/0155724 A1 | 6/2017 | Haddad |
| 2017/0250917 A1 | 8/2017 | Ruckstuhl |
| 2017/0289067 A1* | 10/2017 | Lu ....................... H04L 41/0896 |
| 2017/0295021 A1 | 10/2017 | Gutierrez |
| 2017/0310611 A1 | 10/2017 | Kumar |
| 2017/0339072 A1 | 11/2017 | Pignataro |
| 2017/0359252 A1 | 12/2017 | Kumar |
| 2018/0091420 A1 | 3/2018 | Drake |
| 2018/0139098 A1 | 5/2018 | Sunavala |
| 2018/0176074 A1 | 6/2018 | Bangalore Krishnamurthy |
| 2018/0198717 A1 | 7/2018 | Khasnabish |
| 2018/0227221 A1 | 8/2018 | Starsinic |
| 2018/0227226 A1 | 8/2018 | Lu |
| 2018/0270113 A1 | 9/2018 | Nainar |
| 2018/0287905 A1 | 10/2018 | Mehta |
| 2019/0349268 A1 | 11/2019 | Pai |
| 2019/0379599 A1 | 12/2019 | Siracusano |

OTHER PUBLICATIONS

Callegati et al., "Dynamic chaining of Virtual Network Functions in cloud-based edge networks," IEEE, Apr. 2015 (Year: 2015), 5 pages.
Bifulco et al., "Ready-to-deploy service function chaining for mobile networks," (NEC Labs Europe), IEEE, Jul. 2016 (Year: 2016), 9 pages.
Quinn et al., "Service Function Chaining: Creating a Service Plane via Network Service Headers,"(Cisco System, IEEE, Nov. 2014 (Year: 2014), 7 pages.
Jeuk et al., "Towards Cloud-Aware Policy Enforcement with Universal Cloud Classification as a Service (UCCaaS) in Software Defined Networks," (Cisco Systems), IEEE, Jan. 2017 (Year: 2017), 7 pages.

* cited by examiner

DYNAMIC CHAIN OF SERVICE FUNCTIONS FOR PROCESSING NETWORK TRAFFIC

RELATED APPLICATIONS

This application is a continuation of U.S. patent application Ser. No. 15/593,516, entitled "A DYNAMIC CHAIN OF SERVICE FUNCTIONS FOR PROCESSING NETWORK TRAFFIC IN A VIRTUAL COMPUTING ENVIRONMENT," filed May 12, 2017, which is hereby incorporated by reference in its entirety.

TECHNICAL BACKGROUND

Traditionally, computer network traffic from a source to a destination may be processed by service functions implemented by distinct physical devices on a communication network. The physical service functions may include a network firewall, load balancer, antivirus, intrusion detection, media optimization, or any other type of function that may be desired for network traffic between a source and a destination. Service functions that process the network traffic in sequence form what is called a service chain. Given that the physical devices of these service functions are connected through traditional network equipment (e.g., routers, switches, etc.), or directly to one another in series, the sequence that network traffic is processed in a service chain is relatively static. That is, either the service functions themselves, or the link sequence between them, must be modified to make changes to the service chain.

Virtualization of service functions (e.g., as virtual machines, containers, containers in virtual machine, unikernel, etc.) has allowed for additional flexibility when implementing the service functions. This is a baseline essential need when new solutions like Network Function Virtualization (NFV) is introduced. However, the static nature of the service chain predominantly remains unless additional network topology intelligence is added to the virtualized environment. For instance, a service chain topology overlay may be created on top of the network virtualization overlay in the network environment, or a new network header may be added to network packets, to provide better control over the service chain or existing packet processing headers (say VLAN-ID) may be manipulated to provide the desired service. All of these options require additional network topology overhead from what would otherwise be needed, as they add control plane, data plane, and Operations, Administration and Management (OAM) requirements.

SUMMARY

The technology disclosed herein enables a dynamic chain of service functions for processing network traffic. In a particular embodiment, a method includes, in a logical router for a logical network connecting service functions, receiving a network packet from a service function over the logical network after the network packet has been processed by the service function. The method further includes determining a new classification of the network packet and determining a next service function based on application of a service chain policy to the new classification. The method also includes directing the network packet to the next service function over the logical network.

In some examples, the method includes, after the network packet has been processed by the next service function and before the logical router passes the network packet to a second next service function, determining the second next service function based on application of the service chain policy to the new classification. The method further includes directing the network packet from the logical router to the second next service function.

In some examples, determining the new classification includes processing the network packet to identify information about the network packet. The information indicates the new classification. In those examples, the information may include an Ethernet encapsulation of the network packet by the one service function or data contained in a header of the network packet. Also, in those examples, processing the network packet may include performing deep packet inspection (DPI) on the network packet to obtain the information.

In some examples, the method includes determining an initial classification of the network packet, determining the service function based on application of the service chain policy to the initial classification, and directing the network packet to the service function over the logical network.

In some examples, determining the initial classification includes classifying the network packet based on a source of the network packet.

In some examples, the method includes receiving an update for the service chain policy in the logical router. The update for the service chain policy indicates a different next service function than the next service function for subsequent network packets having the new classification.

In some examples, the logical router comprises a distributed logical router executing on one or more host computing systems.

In another example, an apparatus is provided having one or more host computing systems configured to implement a logical router for a logical network connecting service functions. The logical router is configured to receive a network packet from a service function over the logical network after the network packet has been processed by the service function. The logical router is further configured to determine a new classification of the network packet; and determine a next service function based on application of a service chain policy to the new classification. The logical router is also configured to direct the network packet to the next service function over the logical network.

DETAILED DESCRIPTION

To allow a service chain to be implemented dynamically in a virtual computing environment without the addition of a service topology network layer, the technology herein leverages the network infrastructure of a virtual computing environment. Specifically, virtual computing environments include virtualization software elements executing on physical host computing systems that in turn hosts virtual computing elements. For example, a hypervisor is a virtualization software element that executes on a host computing system and provides a platform on which one or more virtual machines execute to share the hardware resources of the host computing system. Another example of a virtual computing element is a system-level operating system that supports multiple namespace containers, such as Docker® containers, which are virtualization elements that can connect to a network with their own unique IP and MAC addresses distinct from other containers executing on the same host. The virtualization software elements are further used to enhance the network infrastructure connecting the virtual computing elements supported thereby. A virtualization software element is aptly positioned to operate on those communications since all communications exchanged with a virtual computing element will pass through the virtualization software element. The NSX® network virtualization platform from VMware® is an example of a logical overlay network infrastructure that allows virtual elements to communicate in isolated software-defined networks. Such logical overlay networks allow for a dynamic service chain to be implemented without an additional network topology layer and all the network overhead that comes with that additional layer.

Figure 1:
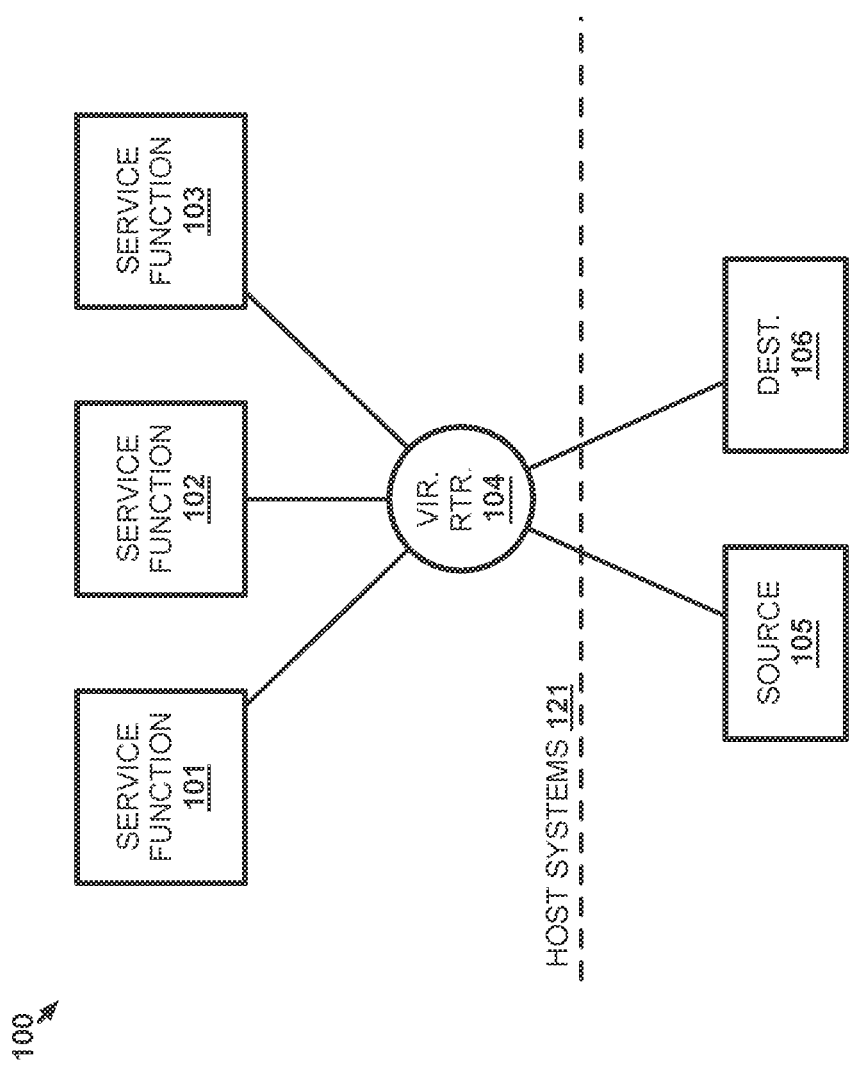
FIG. 1 illustrates a computing environment for processing network traffic using a dynamic chain of service functions.

FIG. 1 illustrates computing environment 100 for processing network traffic using a dynamic chain of service functions. Computing environment 100 includes service function 101, service function 102, service function 103, virtual router 104, traffic source 105, and traffic destination 106. Service functions 101-103, traffic source 105, and traffic destination 106 exchange network communication traffic via virtual router 104 and logical communication links connected thereto. Virtual router 104, which may also be described as a logical router or distributed logical router (DLR) communicates with service functions 101 over logical overlay network links, e.g., using an encapsulation protocol such as VXLAN or NVGRE, which are both well-known standard network overlay tunneling protocols that are well known in the field of logical overlay networking. The logical communication links may be implemented over one or more physical communication links as well as intervening networks, systems, and devices (e.g., routers, switches, etc.). Service functions 101-103 are executing as or within respective virtual computing elements on one or more host computing systems 121. Virtual router 104 is also executing on host computing systems 121 as part of a virtual network infrastructure for the virtual computing elements. Traffic source 105 and traffic destination 106 may each comprise a computer system/device, a network, a network domain or subdomain, or some other location from/to which data packets may enter and exit virtual router 104. It should be understood that traffic source 105 and traffic destination 106 may be, but need not be, the origin of the data packets or the final destination of the data packets. Likewise, while traffic source 105 and traffic destination 106 are shown outside of host computing systems 121, traffic source 105 and/or traffic destination 106 may also be implemented as virtual computing elements on host computing systems 121.

In operation, service functions 101-103 comprise possible service functions that make up a service chain and may include a virtual network firewall, load balancer, antivirus scanner, intrusion detector, media optimizer, or any other type of function for processing network traffic. Service functions 101-103 operate on whatever network traffic is sent to them regardless of where each service function falls in the sequence of a service chain for the network traffic. In some cases, one or more of service functions 101-103 may be even be excluded from the service chain. Accordingly, as will be explained in more detail below, virtual router 104 can dynamically change the sequence of service functions 101-103 in a service chain without affecting the operation of the individual service functions based on metadata information.

Figure 2:
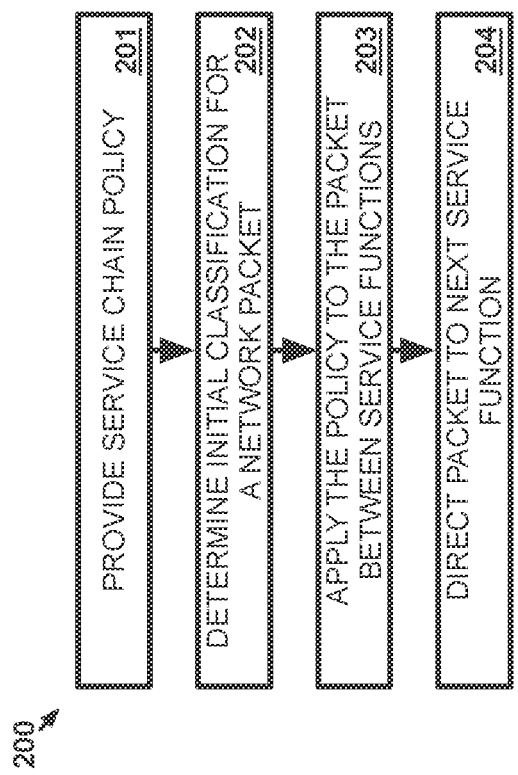
FIG. 2 illustrates a method of operating the computing environment to process network traffic using a dynamic chain of service functions.

FIG. 2 illustrates method 200 of operating computing environment 100 to process network traffic using a dynamic chain of service functions. In method 200, virtual router 104 is provided with a service chain policy (201). The service chain policy is used by virtual router 104 after each hop (i.e., service function) of a service chain to determine where network traffic should be directed at the next hop. The service chain policy indicates a sequence of service functions 101-103 to use depending on how network traffic is classified. Network traffic may be classified based on a source of the network traffic, a destination to which the network traffic is directed, the type of communications carried by the network traffic (e.g., protocol type, media type, etc.), the amount of network traffic, or any other way in which data traffic can be distinguished—including combinations thereof. The service chain policy may be provided by a controller of virtual router 104, may be provided by user input to virtual router 104 either directly or through the controller, may be generated automatically based on historical service chain application to network traffic, may be provided to virtual router 104 by a service orchestration platform (or some other external system), or may be obtained by virtual router 104 in some other manner. Additionally, virtual router 104 may be provided with subsequent updates to the service chain policy.

Method 200 further provides virtual router 104 determining an initial classification of a network packet entering the dynamic service chain from traffic source 105 (step 202). The initial classification indicates at least a first service function of service functions 101-103 in a sequence of the service chain. That is, virtual router 104 may apply the service chain policy to the initial classification to determine which of service functions 101-103 the network packet should be directed to first. It should be understood that, while method 200 is described with respect to a single packet, the single packet may be one of many packets to which method 200 is applied. Virtual router 104 may itself assign the initial classification to the network packet or may determine the initial classification of the network packet as assigned by some other system, such as a gateway positioned between traffic source 105 and virtual router 104. When classified by another system, the initial classification may be transferred to virtual router 104 along with the network packet (e.g., piggybacked with the network packet). The initial classification may be something that can be gleaned from the network packet's header information, such as the network packet being from traffic source 105 and being directed to traffic destination 106. The service chain policy may therefore indicate that packets between traffic source 105 and traffic source 105 should first be directed to a particular service function. The initial classification may also, or instead, be based on other information from the network packet's payload, such as the type of data the network packet is carrying, a protocol used by the data in the network packet, or some manner in which the data carried by the network packet may be distinguished—including combinations thereof. Virtual router 104 may therefore be able to classify network packet traffic up to Level 7 (L7), which typically requires Deep Packet Inspection (DPI). In some cases, the virtual network infrastructure may be configured to classify network packets for other purposes and, therefore, would not required additional capabilities to perform the classification for virtual router 104.

After the network packet has been processed by a service function in the sequence of the service chain and before virtual router 104 passes the network packet to the next service function in the sequence, method 200 provides virtual router 104 applying the service chain policy to the network packet to determine the next service function in the sequence (203). In other words, virtual router 104 ability to reapply the service chain policy at each hop of the network packet, so the sequence of the service chain can be changed even in mid sequence. In some cases, virtual router 104 may first determine whether to reclassify the network packet. The reclassification may be performed in a manner similar to that described above for the initial classification. If the network packet's classification remains the same, then virtual router 104 will apply the service chain policy to determine the next hop under the same classification as the previous hop. Otherwise, if the network packet's classification changes, then virtual router 104 will apply the service chain policy to determine the next hop under that newly changed classification.

Regardless of the classification used to determine the next service function hop, once that next service function has been determined, method 200 provides virtual router 104 directing the network packet to the next service function (204). Steps 203 and 204 repeat until the service chain policy indicates that no more service functions remain in the service chain and the network packet is passed to traffic destination 106. However, it should be understood that some service functions, such as a network firewall function, may themselves prevent a network packet from being passed onto the next service function by stopping the network packet before the network packet is passed back to virtual router 104.

Figure 3:
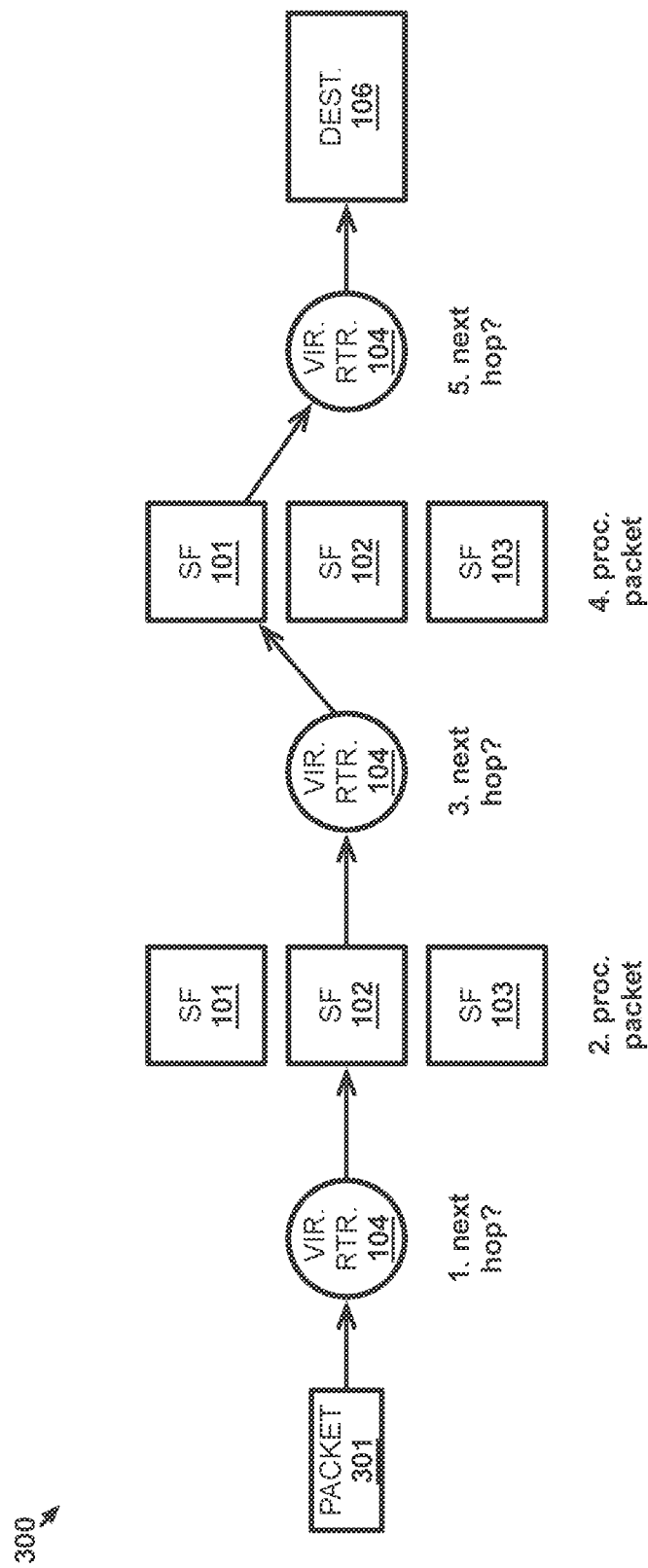
FIG. 3 illustrates an operational scenario of the computing environment to process network traffic using a dynamic chain of service functions according to one implementation.

FIG. 3 illustrates operational scenario 300 of computing environment 100 to process network traffic using a dynamic chain of service functions according to one implementation. Scenario 300 is an example of how method 200 may be applied to network packet 301 that ends up being processed by two service functions in a service chain before being passed to traffic destination 106. Network packet 301 is first received into virtual router 104 at step 1 where virtual router 104 determines a first service function of service functions 101-103 to process network packet 301 based what the service chain policy indicates regarding network packet 301's initial classification. In this case, service function 102 is determined to be the first service function in the sequence that is the service chain for network packet 301. Service function 102 receives network packet 301 and processes network packet 301 at step 2 before passing network packet 301 back to virtual router 104.

Upon receiving network packet 301 from service function 102, virtual router 104 again determines at step 3 which of service functions 101-103 should next process network packet 301. In all likelihood, service function 102 would not process network packet 301 again but there may exist a situation where the service chain policy indicates that it should. Nevertheless, in this example, virtual router 104 determines that the next hop for network packet 301 should be service function 101. Service function 101 may be indicated as the next hop by the service chain policy still based on the initial classification of network packet 301 or network packet 301 may be reclassified by virtual router 104 during step 3. In some cases, if network packet 301 is reclassified, the reclassification may be due to the processing performed by service function 102 that modified network packet 301 in some way. Service function 101 receives network packet 301 and processes network packet 301 at step 4 before passing network packet 301 back to virtual router 104.

Upon receiving network packet 301 from service function 101, virtual router 104 again determines a next hop of network packet 301 at step 5. As was the case at step 3, virtual router 104 may reclassify network packet 301 before applying the service chain policy to that new classification. In this case, virtual router 104 determines that no more service functions are needed in the service chain and passed network packet 301 to traffic destination 106. While service function 103 was not involved in the service chain of scenario 300, it should be understood that other network packets, based on their characteristics according to the service chain policy, may be routed through service function 103 in addition to service function 102 and service function 101 or may replace one or both of service function 101 and service function 102 in the service chain. Thus, the service chain policy dictates which service functions are in the service chain for a particular network packet and which order those service functions fall in the sequence of the service chain.

Figure 4:
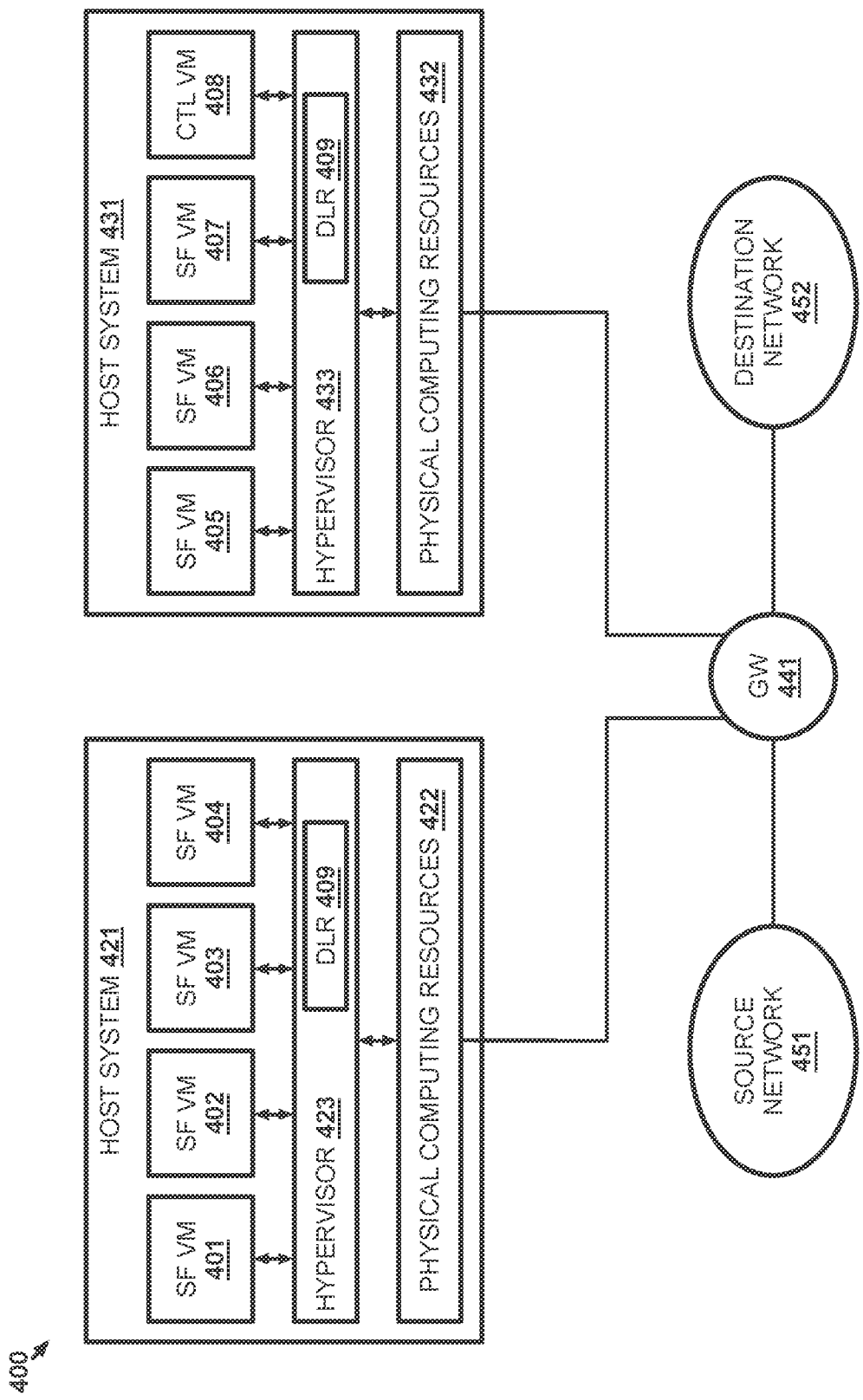
FIG. 4 illustrates another computing environment for processing network traffic using a dynamic chain of service functions.

FIG. 4 illustrates computing environment 400 for processing network traffic using a dynamic chain of service functions. Computing environment 400 includes host computing system 421, host computing system 431, communication gateway 441, source communication network 451, and destination communication network 452. Communication networks 451 and 452 may include the Internet, a private micro data center, a mobile edge computing node, one or more local area networks, and/or one or more wide area networks. It should be understood that using communication networks as the source and destination is merely exemplary and that the source and destination could be other types of systems, including virtualized workloads on host computing systems.

In this example, host computing system 421 executes hypervisor 423 to allocate physical computing resources 422 among service function virtual machines 401-404. Likewise, host computing system 431 executes hypervisor 433 to allocate physical computing resources 432 among service function virtual machines 405-407 and control virtual machine 408. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 each include an instance of distributed logical router (DLR) 409, which is part of the virtual network infrastructure that connects virtual machines executing on host computing system 421 and host computing system 431.

It should be understood that the distribution of virtual machines evenly across two host computing systems, as shown in FIG. 4, is merely exemplary. The eight virtual machines shown may instead be implemented on any number of host computing systems from one to eight. Likewise, host computing systems 321 and 331 could host additional hosts and virtual machines and/or other virtual elements that are not involved in this example.

Figure 5:
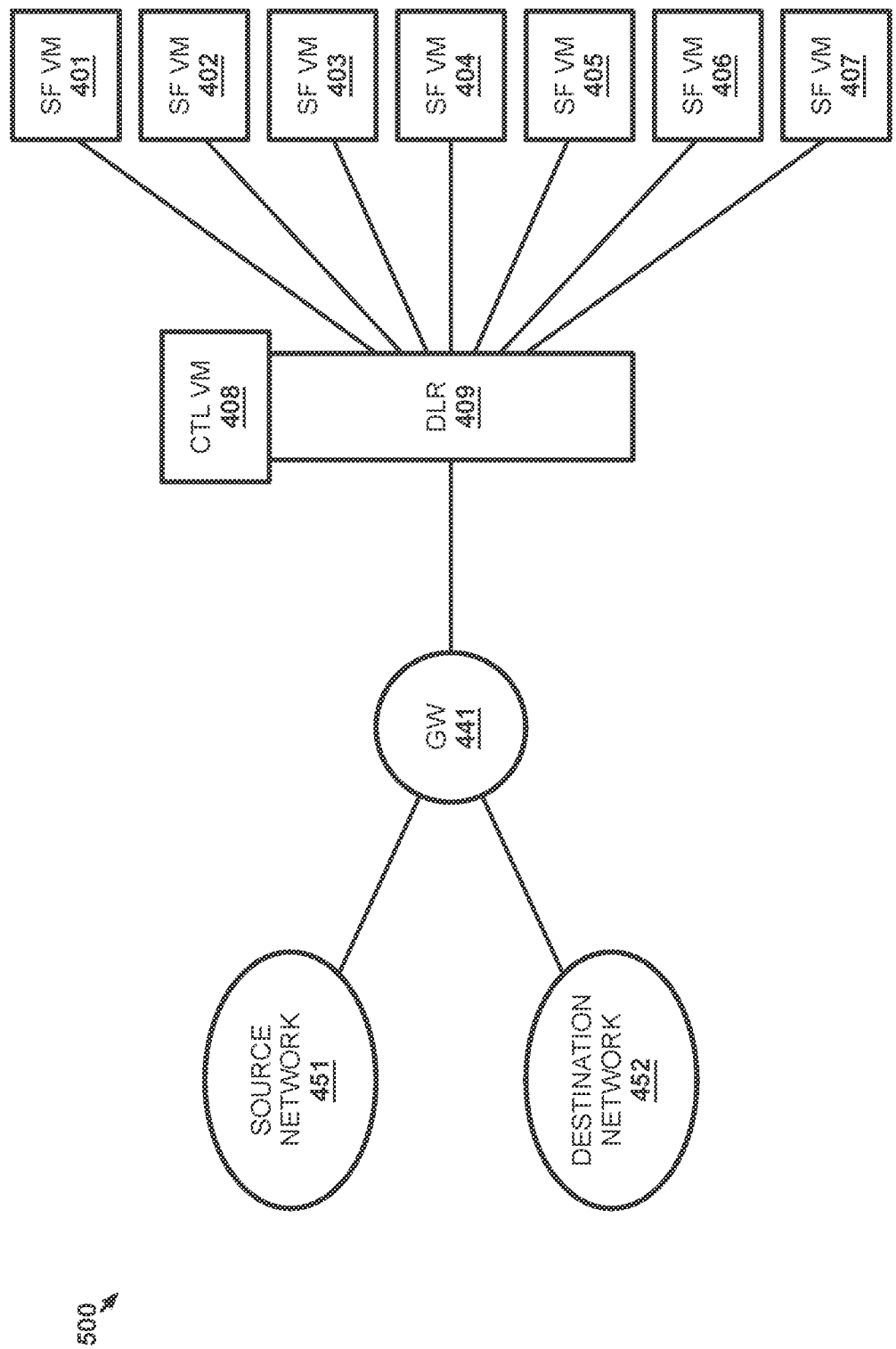
FIG. 5 illustrates a logical arrangement of the other computing environment to process network traffic using a dynamic chain of service functions.

FIG. 5 illustrates a logical arrangement 500 of computing environment 400 to process network traffic using a dynamic chain of service functions. As shown by logical arrangement 500, the separate instances of DLR 409 on host computing system 421 and host computing system 431 operate to form a singular logical router between service function VMs 401-407 and gateway 441. Control VM 408 is not part of the data plane through which service function VMs 401-407 and gateway 441 exchange network traffic but, instead, controls at least DLR 409 via a control plane in the virtual environment that includes service function VMs 401-407 and DLR 409. Gateway 441 is configured to pass network traffic into and out of the virtual environment. Additional gateways may be present in other examples. Likewise, while gateway 441 is shown only connected to source communication network 451 and destination communication network 452, gateway 441 may be connected to other communication networks not shown.

Figure 6:
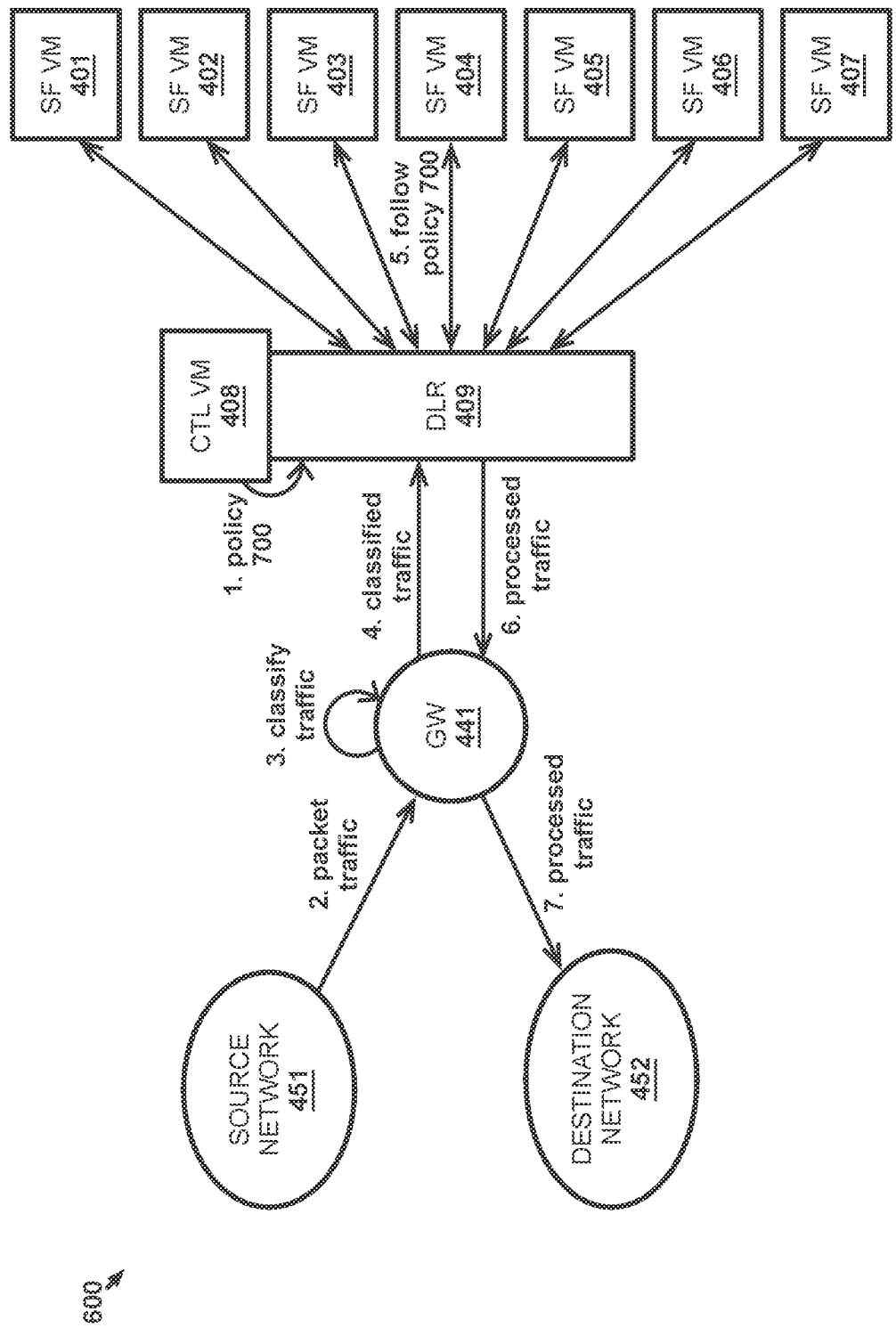
FIG. 6 illustrates an operational scenario of the other computing environment to process network traffic using a dynamic chain of service functions according to one implementation.

FIG. 6 illustrates operational scenario 600 of computing environment 400 to process network traffic using a dynamic chain of service functions according to one implementation. In scenario 600, control VM 408 provides service chain policy 700 to DLR 409 over the virtual environment's control plane at step 1. After this initial provision of service chain policy 700 to DLR 409, service chain policy 700 may be updated at times in the future by control VM 408 providing such updates to DLR 409. Service chain policy 700 may have been provided to control VM 408 by a user (e.g., administrator) of computing environment 400 or may have been generated by control VM 408 automatically with or without input from a user. Once DLR 409 has been provided with service chain policy 700, DLR 409 can begin routing traffic to service function VMs 401-407 based on service chain policy 700.

In this example, at step 2, network packet traffic is received at gateway 441 from source communication network 451. It should be understood that the use of gateway 441 in this embodiment is merely exemplary. Other examples, may use other elements to provide the initial classification, such as customer premises equipment in source communication network 451 or in DLR 409 itself. Upon receiving the network traffic, gateway 441 classifies the network traffic to assign an initial classification to the network traffic. Since gateway 441 in this example is not capable of DPI type classifications, the initial classification is based on what gateway 441 can determine from L3 information in the network traffic. For instance, gateway 441 may simply recognize that the network traffic was received from source communication network 451 and is directed to destination communication network 452. In other examples, gateway 441 may determine an L3 protocol being used by the network traffic and use that to determine the initial classification (e.g., classified as video call packets from source communication network 451).

After classifying the network traffic, gateway 441 passes the network traffic onto DLR 409 at step 4. The initial classification of the network traffic may be passed to DLR 409 in a packet that piggybacks on the network traffic in one example. In other examples, gateway 441 may ensure that the information used by gateway 441 to determine the initial classification of the network traffic is maintained when transferred to DLR 409 so that DLR 409 can make a like determination. In yet other examples, gateway 441 may tag traffic using Virtual Local Area Network (VLAN) tagging, or some other form of network traffic tagging, to indicate the initial classification. In these examples, gateway 441 may encapsulate the network traffic using with a certain VLAN tag value depending on the initial classification and DLR 409 recognizes those VLAN tag values for classification purposes rather than VLAN routing. Other manners of providing the initial classification to DLR 409, such as including information in metadata, may also be used. Once the network traffic is received by DLR 409, DLR 409 determines what gateway 441 determined to be the initial classification of the network traffic so that DLR 409 can being to follow service chain policy 700 with respect to service chain policy 700 at step 5.

Figure 7:
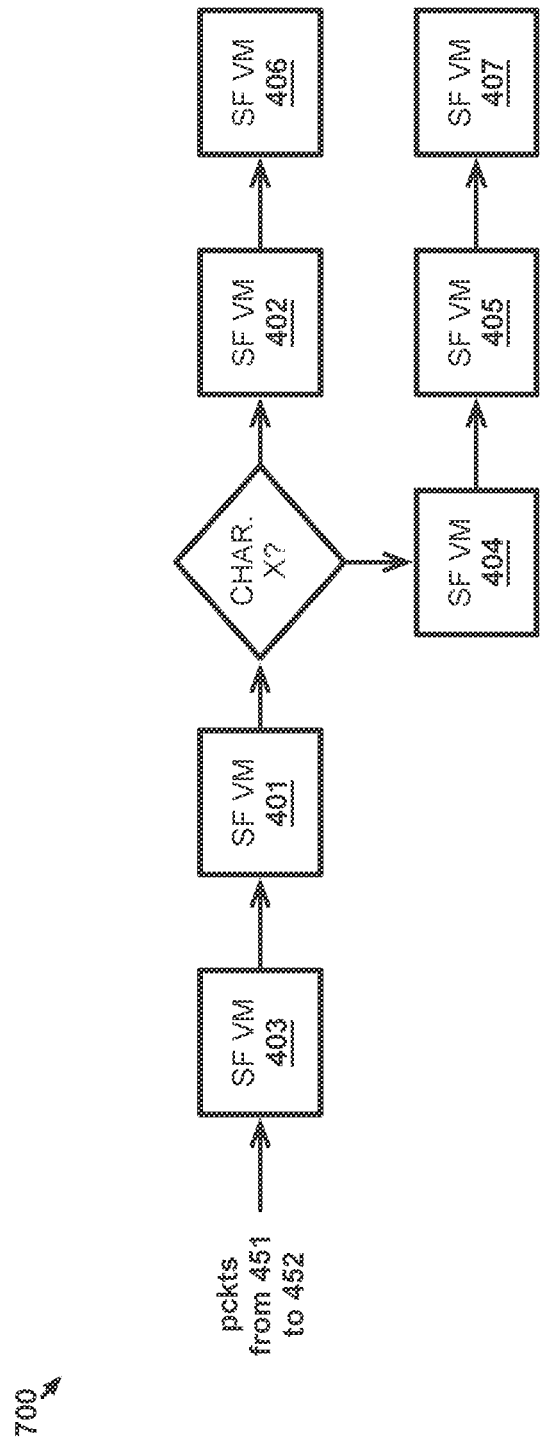
FIG. 7 illustrates a service chain policy for the operational scenario of the other computing environment to process network traffic according to one implementation.

FIG. 7 illustrates service chain policy 700 for scenario 600 to process network traffic according to one implementation. In particular, FIG. 7 provides a flowchart representation of service chain policy 700 to better understand how DLR 409 follows service chain policy 700 at step 5 of scenario 600. Thus, service chain policy 700 focuses on network traffic having the initial classification of the network traffic in scenario 600. Although, it should be understood that service chain policy 700 may include other not-shown possible service chains for other possible classifications. Likewise, other possible classifications may be handled by different service chain policies also provided to DLR 409.

In this example, the initial classification is that the network traffic includes packets from source communication network 451 directed to destination communication network 452. Service chain policy 700 indicates that traffic of that type be first processed by service function VM 403, so DLR 409 passes the network traffic to service function VM 403 accordingly. Service function VM 403, upon completion of its processing of the network traffic, will pass the network traffic back to DLR 409. DLR 409 then references service chain policy 700 to determine where the network traffic exiting service function VM 403 should be sent next. In this case, service chain policy 700 indicates that the network traffic from service function VM 403 should be sent to service function VM 401. Thus, DLR 409 passes the network traffic to service function VM 401, which processes the network traffic before passing the network traffic back to DLR 409.

Upon receiving the network traffic from service function VM 401, service chain policy 700 indicates to DLR 409 that DLR 409 should determine whether the network traffic includes characteristic X. Having characteristic X diverts network traffic to service function VM 404. In contrast, not having characteristic X indicates that the network traffic should be passed to service function VM 402. For example, characteristic X may comprise a characteristic that indicates the network traffic requires a more thorough antivirus scan than would otherwise be used. Thus, service chain policy 700 directs the network traffic to a branch of the service chain where a service function VM will perform the more thorough antivirus scan. In another example, characteristic X may indicate that the network traffic contains sensitive information that should include a level of encryption provided by a certain service function VM.

Characteristic X may be any characteristic of the network traffic that may be identified at L2 up to L7, such as a type of data carried by the traffic, an application that generated the traffic, information determined while a service function VM was processing the traffic, a time in which the traffic was received, or any other information that could describe the traffic or its contents. As such, depending on the characteristic, DLR 409 may need to use DPI capabilities to identify the characteristic from the network traffic. In some cases, characteristic X may be indicated to DLR 409 by the service function VM that just processed the network traffic. Such an indication may be provided in a manner similar to the tagging example from above, by passing metadata associated with the network traffic to DLR 409, by encapsulating the network traffic, or in some other manner. Also, while this example discusses a single characteristic X, multiple characteristics may be used determine which service function VM should next receive the network traffic. Likewise, while service chain policy 700 in this example only illustrates one point in the service chain where network traffic may go to one service function or another, other examples may provide multiple such options at other points in the service chain, including after every service function VM processes the network traffic. Furthermore, while service chain policy 700 shows only two possible options when determining characteristic X, additional options may exist in other examples depending on characteristics of the network traffic.

Regardless of what characteristic X indicates, for the purposes of this example, the network traffic is found by DLR 409 to include characteristic X. DLR 409, therefore, next passes the network traffic to service function VM 404 for processing instead of service function VM 402. Upon receiving the processed network traffic from service function VM 404, DLR 409 then references service chain policy 700 to determine that the network traffic should next be passed to 405 for processing. Similarly, upon receiving the processed network traffic from service function VM 405, DLR 409 then references service chain policy 700 to determine that the network traffic should next be passed to service function VM 407.

No service function VMs remain after service function VM 407 in service chain policy 700. Therefore, once DLR 409 receives the network traffic after being processed by service function VM 407, DLR 409 determines that the service chain has ended for the network traffic after having been processed by service function VMs 403, 401, 404, 404, 405, and 407. The network traffic can then be directed on its way to destination communication network 452.

Referring back to scenario 600, DLR 409 passes the network traffic back to gateway 441 at step 6 after the traffic was processed by the service function VMs in accordance with service chain policy 700. Gateway 441 responsively forwards that processed network traffic on to destination communication network 452 at step 7. It should be understood that the network traffic all need not complete each step before moving on to the next step, or service function at step 5. That is, packets of the network traffic may still be passing through a previous stage while other packets of the same network traffic are passing through a subsequent stage.

Figure 8:
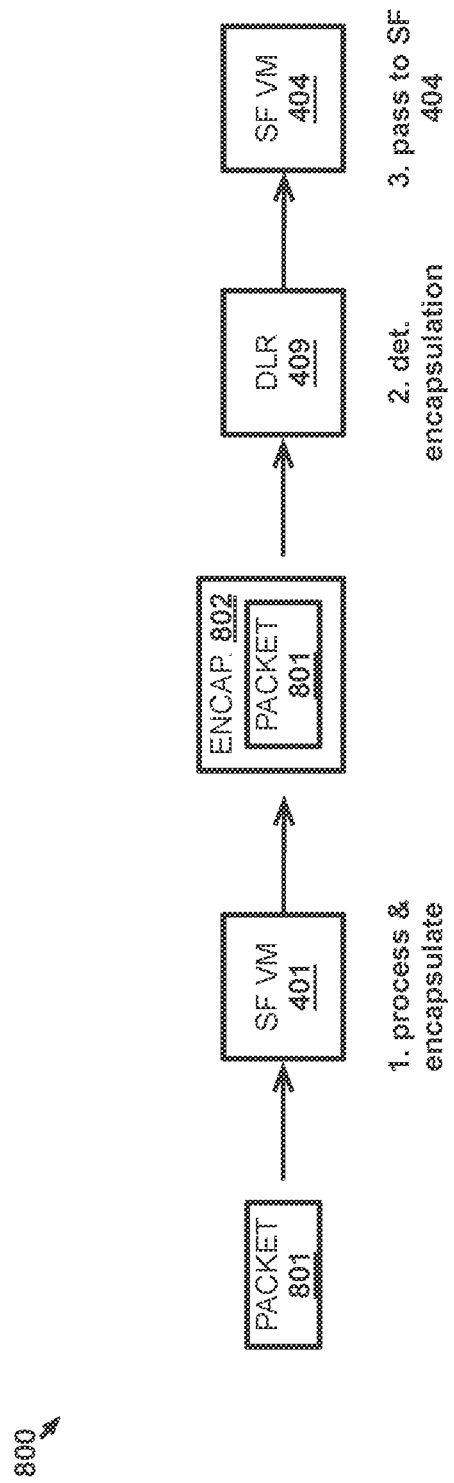
FIG. 8 illustrates an operational scenario for implementing the service chain policy to process network traffic according to one implementation.

FIG. 8 illustrates an operational scenario 800 for implementing the service chain policy to process network traffic according to one implementation. This example focuses on one possible way in which DLR 409 may determine whether the network traffic has characteristic X when using service chain policy 700 to determine whether the network traffic should be passed to service function VM 402 or service function VM 404. In this case, service function VM 401, from which DLR 409 last receives processed network traffic, provides a hint of sorts to DLR 409 indicating characteristic X to DLR 409. Specifically, the hint is provided to DLR 409 by way of an Ethernet encapsulation of the network traffic. A similar technique could also be used by gateway 441 when providing the initial classification of the packet traffic in the above example. While this example uses the hint to indicate characteristic X, in other examples the hint may be used to indicate to DLR 409 that the traffic should be reclassified, which may cause the traffic to be processed by a service chain policy other than service chain policy 700.

Scenario 800 begins as data packet 801, which is a packet of the network traffic discussed above, is passed to service function VM 401 for processing. At step 1, service function VM 401 processes data packet 801 as part of the network traffic. While in the examples above it is noted that the service function VMs do not need to be modified in their operation for DLR 409 to dynamically select service function VMs for the service chain, service function VM 401 is configured to encapsulate traffic that should be processed by the service function VM 404 branch of the service chain. Thus, since data packet 801 is determined to warrant the service function VM 404 branch, likely along with the other data packets of the network traffic, service function VM 401 encapsulates data packet 801 into packet encapsulation 802 before transferring packet encapsulation 802 to DLR 409. Packet encapsulation 802 may be an Ethernet encapsulation, such as dot1q or dot1ad, although other types of packet encapsulation may also be used. In this example, the mere fact that data packet 801 is encapsulated constitutes the hint, however, the hint in some examples may include metadata with more explicit information about data packet 801.

Upon receiving packet encapsulation 802, DLR 409 recognizes the encapsulation and determines at step 2 that data packet 801 has characteristic X, which causes DLR 409 to reclassify data packet 801. In some examples, though not necessarily relevant to this example, different types of encapsulation may indicate different characteristics to DLR 409. After reclassification, DLR 409 passes data packet 801 to service function VM 404 in accordance with service chain policy 700. Before being passed to service function VM 404, DLR 409 may strip data packet 801 of packet encapsulation 802 or may send data packet 801 with packet encapsulation 802 intact. It should be understood that other manners of hinting characteristics of network traffic to DLR 409 may also be used.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in a logical router for a logical network connecting service functions:
   receiving a network packet from a service function over the logical network after the network packet has been processed by the service function;
   determining a new classification of the network packet; and
   determining a next service function based on application of a service chain policy to the new classification; and directing the network packet to the next service function over the logical network.

2. The method of claim 1, comprising:
after the network packet has been processed by the next service function and before the logical router passes the network packet to a second next service function, determining the second next service function based on application of the service chain policy to the new classification; and
directing the network packet from the logical router to the second next service function.

3. The method of claim 1, wherein determining the new classification comprises:
processing the network packet to identify information about the network packet, wherein the information indicates the new classification.

4. The method of claim 3, wherein the information comprises an Ethernet encapsulation of the network packet by the one service function.

5. The method of claim 3, wherein the information comprises data contained in a header of the network packet.

6. The method of claim 3, wherein processing the network packet comprises:
performing deep packet inspection (DPI) on the network packet to obtain the information.

7. The method of claim 1, comprising:
determining an initial classification of the network packet;
determining the service function based on application of the service chain policy to the initial classification; and
directing the network packet to the service function over the logical network.

8. The method of claim 7, wherein determining the initial classification comprises:
classifying the network packet based on a source of the network packet.

9. The method of claim 1, comprising:
receiving an update for the service chain policy in the logical router, wherein the update for the service chain policy indicates a different next service function than the next service function for subsequent network packets having the new classification.

10. The method of claim 1, wherein the logical router comprises a distributed logical router executing on one or more host computing systems.

11. An apparatus comprising:
one or more physical host computing systems configured to implement a logical router for a logical network connecting service functions;
the logical router configured to:
receive a network packet from a service function over the logical network after the network packet has been processed by the service function;
determine a new classification of the network packet; and
determine a next service function based on application of a service chain policy to the new classification; and
direct the network packet to the next service function over the logical network.

12. The apparatus of claim 11, wherein the logical router is configured to:
after the network packet has been processed by the next service function and before the logical router passes the network packet to a second next service function, determine the second next service function based on application of the service chain policy to the new classification; and
direct the network packet from the logical router to the second next service function.

13. The apparatus of claim 11, wherein to determine the new classification, the logical router is configured to:
process the network packet to identify information about the network packet, wherein the information indicates the new classification.

14. The apparatus of claim 13, wherein the information comprises an Ethernet encapsulation of the network packet by the one service function.

15. The apparatus of claim 13, wherein the information comprises data contained in a header of the network packet.

16. The apparatus of claim 13, wherein to process the network packet, the logical router is configured to:
perform deep packet inspection (DPI) on the network packet to obtain the information.

17. The apparatus of claim 11, wherein the logical router is configured to:
determine an initial classification of the network packet;
determine the service function based on application of the service chain policy to the initial classification; and
direct the network packet to the service function over the logical network.

18. The apparatus of claim 17, wherein to determine the initial classification, the logical router is configured to:
classify the network packet based on a source of the network packet.

19. The apparatus of claim 11, wherein the logical router is configured to:
receive an update for the service chain policy in the logical router, wherein the update for the service chain policy indicates a different next service function than the next service function for subsequent network packets having the new classification.

20. The apparatus of claim 11, wherein the logical router comprises a distributed logical router executing on the one or more host computing systems.

* * * * *